(12) United States Patent
Schumacher

(10) Patent No.: US 7,752,263 B2
(45) Date of Patent: Jul. 6, 2010

(54) METHOD FOR PROVISION OF AN ADDRESS IN A DATA NETWORK

(76) Inventor: Jochen Schumacher, Oststr. 1, 50996 Köln (DE)

( * ) Notice: Subject to any disclaimer, the term of this patent is extended or adjusted under 35 U.S.C. 154(b) by 119 days.

(21) Appl. No.: 11/719,090

(22) PCT Filed: Nov. 9, 2005

(86) PCT No.: PCT/EP2005/055845
§ 371 (c)(1),
(2), (4) Date: Nov. 9, 2007

(87) PCT Pub. No.: WO2006/053850
PCT Pub. Date: May 26, 2006

(65) Prior Publication Data
US 2008/0208989 A1     Aug. 28, 2008

(30) Foreign Application Priority Data
Nov. 16, 2004 (DE) .................. 10 2004 055 331

(51) Int. Cl.
*G06F 15/16* (2006.01)
*H04M 3/42* (2006.01)

(52) U.S. Cl. .................................. 709/204; 455/415

(58) Field of Classification Search .......... 709/203, 709/206, 224, 229, 232; 713/170, 171, 181, 713/183; 380/47, 277; 455/407, 408, 412.1, 455/412.2
See application file for complete search history.

(56) References Cited

U.S. PATENT DOCUMENTS 6,185,184 B1    2/2001  Mattaway et al.
6,366,950 B1 *  4/2002  Scheussler et al. .......... 709/206
6,678,720 B1 *  1/2004  Matsumoto et al. ......... 709/204

(Continued)

FOREIGN PATENT DOCUMENTS

GB    2401292 A  * 11/2004

(Continued)

OTHER PUBLICATIONS

The IRC Command Cosmos, an advanced guide to IRC commands. Aug. 2002 Edition 2.2.*

(Continued)

*Primary Examiner*—Wing F Chan
*Assistant Examiner*—Jonathan Willis
(74) *Attorney, Agent, or Firm*—Muncy, Geissler, Olds, & Lowe, PLLC

(57) ABSTRACT

The invention relates to a method for provision of an address of an online computer, connected to a data network, for at least one receiving computer. The aim of the invention is the provision of an address, in particular, a temporary IP address in which known disadvantages do not occur. Said aim is achieved, whereby the online computer carries out the following steps: transmission of a first data set, with the identification for at least one server structure globally accessible by the data network, to the receiver computer, whereby the server structure is selected from a number of available server structures, transmission of a second data set, identifying at least one code designator, to the receiving computer and storage of the address of the online computer together with the code designator on the identified server structure.

19 Claims, 4 Drawing Sheets

U.S. PATENT DOCUMENTS

| | | | |
|---|---|---|---|
| 6,742,116 B1* | 5/2004 | Matsui et al. | 713/171 |
| 2002/0006803 A1* | 1/2002 | Mendiola et al. | 455/466 |
| 2002/0136410 A1* | 9/2002 | Hanna | 380/277 |
| 2002/0150110 A1* | 10/2002 | Inbar et al. | 370/401 |
| 2003/0055893 A1* | 3/2003 | Sato et al. | 709/204 |
| 2004/0128540 A1* | 7/2004 | Roskind | 713/201 |
| 2005/0044144 A1* | 2/2005 | Malik et al. | 709/205 |
| 2005/0099996 A1* | 5/2005 | Monai et al. | 370/352 |

FOREIGN PATENT DOCUMENTS

| | | |
|---|---|---|
| GB | 2401292 A1 | 11/2004 |

OTHER PUBLICATIONS

S. Williamson Referral Whois (RWhois) Protocol V1.5 Jun. 1997 RFC 2167.*

C. Kelt Internet Relay Chat: Client Protocol Apr. 2000 RFC 2812.*

International Search Report for application No. WO 2006/053850 A1 mailed Mar. 2, 2006 (in English and in German).

Written Opinion for application No. WO 2006/053850 A1 mailed May 22, 2006 (English translation).

* cited by examiner

METHOD FOR PROVISION OF AN ADDRESS IN A DATA NETWORK

AREA OF TECHNOLOGY

The invention relates to a method for provision of an address of an online computer, connected to a data network, for at least one receiving computer.

In particular, the invention relates to a method of providing an IP address of the online computer connected to the Internet for other computers also connected to the Internet. In the following the invention will be described in the context of Internet structures, Internet protocols, and addresses used in the Internet. One skilled in the art will find it obvious that the invention is also applicable to other data networks and data transmission protocols and address standards.

Every computer connected to the Internet must have a unique Internet address, the so-called IP address. Currently the IP addresses used conform to IPv4 (Internet Protocol version 4). They comprise 4 successive bytes. Version 6 of the Internet Protocol, in which each address comprises 16 Bytes, has been devised as a successor. According to this version, a larger number of IP addresses is available.

Large numbers of computers, particularly privately used computers, do not have any fixed assigned address. They typically obtain Internet access through an Internet service provider. At the time of establishing a connection of this computer to the Internet, the Internet service provider assigns a "temporary IP address" to that computer. This procedure is also referred to as "assignment of a dynamic address", newly assigned to a given computer on the occasion of each establishment of a connection to the Internet.

For a number of applications, direct exchange of data between two computers connected to the Internet is required. Such direct data exchange is possible only if the computer carrying out the data transfer knows the current address of the computer to which the data are to be transferred.

Accordingly, programs have been developed which facilitate direct communication between two computers connected to the Internet which computers have dynamic Internet addresses. Such programs are referred to as "Instant Messenger" programs. The program ICQ ("I seek you") is a widely used example of such an "Instant Messenger" program. A user of such a program can set up a list of correspondents called a "buddy list". The computer user inserts, into the buddy list, identification information concerning the computers with which direct connections will be permissible. Each user of an ICQ program, upon logging on to the Internet, is automatically connected to a central computer, over which conversations ("chat") can be conducted, files can be exchanged, and messages can be sent.

Alternatively, instead of transmission of messages via the central computer, it is possible to deposit only the IP address which has been temporarily assigned to the users computer on the central computer when logging on to the Internet. Each user of the same ICQ program can then query the current temporary IP addresses of computers which are currently connected to the Internet and are on that user's buddy list.

The drawback of known ICQ programs is that the querying and determination of the IP addresses are accomplished centrally via a computer. Such centralized data management subjects users of the program to monitoring of the communications and to distribution, to said users, of unrequested messages (spam) or advertising messages.

DISCLOSURE OF THE INVENTION

The underlying problem of the present invention was to devise a method of provision of an address, particularly a temporary IP address, wherein the described drawbacks are avoided.

This problem is solved according to the invention in that an online computer the address of which in the data network is to be provided for one or more receiving computers carries out the following steps:
   transmission of a first data set comprising the identification of at least one server structure globally accessible over the data network, to the receiving computer, the server structure being selected from a plurality of available server structures;
   transmission of a second data set which identifies at least one codeword, to the receiving computer; and
   storage of said address of the online computer together with said codeword on the identified server structure.

In other words, the exchange of addresses no longer occurs via a central computer but rather with the aid of a plurality of available server structures which are globally contactable (accessible) over the data network. For this purpose, IRC networks and IRC servers, accessible over the Internet, are particularly suitable.

IRC (Internet relay chat) is a system which enables communication over the Internet simultaneously with numerous other Internet subscribers. An IRC network is comprised of at least one IRC server, but usually a large number of IRC servers, which are readily accessible by any computer connected to the Internet. Each subscriber in an IRC network is known exclusively by his nickname which he can freely choose. The only limitation is that the nickname may not exceed 9 characters and that the identical nickname may not be used twice in the given IRC network at a given time. The first IRC programs were put into effect in the late 1980s. Subsequently, IRCs have come to be widely employed on the Internet. There are numerous worldwide IRC networks, with numerous IRC servers.

The oldest and largest network is the so-called EFNet. The IRCNet has split from the EFNet. Other IRC networks are the Undernet, the DALnet, the German networks Wunder-Net (a server in this network is IRC-wunder-net.org) and BLAFA-SELNet (a server in this German IRC network is lam.blafa-sel.de). In other countries, other national IRC networks are in operation. Communication in IRCs takes place via lines of text.

To realize the invention it is not necessary to designate as the server structure a network comprising a plurality of different servers. For executing the method of the invention it is sufficient to have one server, where the user can log on using a nickname or alias (i.e. without disclosure his true identity) and from which other Internet users can query a unique address (e.g. DNS address or IP address) of a user who is logged on. The server must have functionality which responds to a query containing the codeword of a given user by providing a response which contains the address of that user.

IRC servers and IRC networks are merely specific examples of globally accessible server structures on the Internet, with which server structures the invention can be realized.

Because no central computer is used for transmitting the IP addresses, there is no opportunity to monitor the users of the method of the invention or to analyze their behavior. This reduces the risk that unwanted messages or advertisements are sent to the user of the method. Also, no central computer is capable of determining the IP addresses of all of the persons using the method of the invention and utilizing this information for, e.g., distribution of spam or the like.

In addition to providing the receiving computer with the identification of the globally accessible server structure in the first data set, a second data set is sent to the receiving computer, which identifies at least one codeword. If the server structure is an IRC server or IRC network, the codeword is a so called nickname (German: "Spitzname"). It is evident that both of the data sets can be included within a single data structure or data file.

Finally, the address is stored together with the codeword, on the globally accessible server.

Again when using an IRC server, the online computer logs on to the IRC server identified via the first data set with the nickname which corresponds to the codeword identified in the second data set. During this logon process, either the currently assigned IP address of the online computer or a DNS address is stored on the IRC server.

The DNS (Domain Name System) is a system which unambiguously associates IP addresses and corresponding domain names. An Internet subscriber who is connected to the Internet via an Internet service provider is often assigned a user name which is related to the Domain Name of the Internet service provider. Using so-called DNS servers, the IP address of the Internet service provider can be determined, which via the user name directs data to the computer of the associated user.

When the online computer logs on, there is stored on the server either the IP address currently assigned to said online computer or an IP address unambiguously associated with said IP address, in particular a DNS address. The receiving computer needs only to query the identified server while reciting the codeword, which query will be answered by the server structure with a response containing the address of the online computer.

If the server structure is an IRC server or IRC network, the appropriate query is a WHOIS command. This command then results in sending the various items of information concerning the online computer which is logged on to the server, namely sending them to the querying receiving computer. These items of information include the address of the online computer.

There are IRC networks or IRC servers which do not accept a WHOIS command and will not disclose the address of a subscriber who is logged on to this network or server. In such circumstances the function of the IRC server as a message transmitter may be utilized. In order to determine the IP address of the online computer, the receiving computer can send a query to the server structure, which query includes the nickname employed by the online computer. The server structure forwards this query to the address associated with the nickname. The program of the invention which is running on the online computer recognizes the query and causes the online computer to send its address back to the receiving computer. The online computer may also utilize the message transmission function of the server to send its response to the server itself, giving as the addressee the nickname under which the receiving computer has logged on to the server. Alternatively, the online computer can send its IP address directly to the IP address of the receiving computer.

For this it is necessary for the receiving computer to have included its own IP address in its query.

In certain cases (as mentioned above), instead of the IP address an address can be communicated which is based on the Domain Name System (DNS). If a DNS address of the online computer is returned, the receiving computer must send a second query over the Internet in order to ascertain the IP address. This second query may for example be the console command NSlookup followed by the DNS address. Current widely used operating systems, such as, e.g., the Windows operating system of the firm Microsoft, provide a standard function getHostbyName (DNS address) which triggers the sending of the second query, whereupon the IP address is returned by DNS servers. This second query may also be a PING (Packet Internet Groper) which is sent to the DNS address of the online computer, and, with the help of the DNS server, is forwarded to the IP address of the Internet service provider and from this to the user's computer (the online computer). The response returned from the online computer in response to a PING always contains the IP address of the online computer.

According to a practical embodiment, a validity for a limited time period may be assigned to the identification of a server structure globally accessible over the data network. In other words, the name of the server or network is provided with a "time stamp". This time stamp may, e.g., specify a time point after which the identified server structure will no longer be used for the method of the invention. The "time stamp" may also specify a time interval with starting time and ending time during which the identified server structure will be used for the method of the invention. Each time point is defined by specifying the day, month and year, and possibly also the hour, minute, and second.

The first data set may also associate each server structure with a plurality of "time stamps", so that each server structure will be used for the method of the invention at different times. In practice, the first data set may contain a plurality of identifications for globally accessible server structures, each of which is provided with time stamps, the intervals of validity of different server structures covering different time intervals. For each time interval, a primary server structure and a backup server structure may be made available. The backup server structure is used for the method of the invention in case of failure of the primary server. As mentioned, each server structure may be associated with a plurality of time stamps, so that the respective server structure is used for the method of the invention during different time intervals. The first data set should contain server identifications which are valid for a specified time interval (e.g. 1 month, 3 months, or 5 months). The duration may be selectable by the user. Introducing a time limitation on the validity of the data set avoids the possibility that the method of the invention will be employed by unauthorized persons.

At the time of the first contact, typically an e-mail is sent which might possibly be intercepted or read by an unauthorized person. In order to avoid a situation in which such an unauthorized person receives the information needed for the method of the invention (namely for queries of IP addresses of the online computer) for an unlimited period, the duration of validity of the data set is limited. Because the data transmission on the occasion of the first contact occurs over the e-mail system, which is relatively insecure, one may provide that the duration of validity of the data of the first data set is very short. The duration may be, e.g., 1 day or 1 week. Once a direct contact is established via the transmitted IP address, first data sets can be transmitted, in which the indicated servers may be valid for a relatively longer period of time. These data sets are sent directly to the dynamic IP address of the receiving computer, and therefore it is practically impossible for third parties to intercept or read them. Even if they are intercepted, a third party will be unable to associate the data sets with particular computers or persons; the third party will have as the address of the sender only the temporary IP address of the sending computer, and as the address of the receiver only the temporary IP address of the receiving computer.

In this connection it should be mentioned that the method of the invention may also be employed by computers with fixed IP addresses. Under these circumstances, it would be simpler if the IP address were sent one time to the receiving computer. It is practicable to employ the method of the invention with computers having fixed IP addresses because these computers can participate in a standardized method according to the invention whereby a group of individuals who generally have dynamic IP addresses and are members of a community (German: Gemeinschaft) exchange their IP addresses.

Similarly, in practice the codeword which is ascertained via the second data set may also be assigned a time-limited validity. The second data set may identify a plurality of codewords having time-limited validity, the periods of validity covering different time intervals.

The codeword can be computed on the online computer by means of an algorithm and can then be written completely into the second data set. However, it is also possible to have the codeword generally be computed via an algorithm. Users of the same method employ the same computer program in which the algorithm for computing the codeword can be defined. In practice, the algorithm for computing the codeword may have at least one variable. The second data set can then contain only a value of this variable, using which the online computer and the receiving computer proceed to compute the same codeword by means of the aforesaid same algorithm.

This variable or these variables may be assigned limited validity in the second data set, for the motivations described supra.

The algorithm for computing the codeword may utilize other variable data, e.g. time-dependent information such as the date, or the name of the user of the method, etc.

In practice, the method of the invention may be in the form of a so-called "handshake". Under such a scheme, not only does the online computer transfer the information to one or more receiving computers which enables the receiving computer to ascertain the address of the online computer. The receiving computer also transmits to the online computer a first data set with the identification of at least one server structure which is globally accessible over the data network, said server structure being selected from a plurality of available server structures. Further, the receiving computer transmits to the online computer a second data set which identifies at least one codeword. Finally, the receiving computer stores its address, particularly an IP address currently assigned to the receiving computer or a unique DNS address associated with this IP address, together with the codeword, on the identified server structure. In this way, both of the computers involved are provided with each other's current address. Any time when both computers are connected to the Internet and call the IP address of the respective other computer, they transmit to this IP address an updated first data set and an updated second data set. By this mechanism, one assures that the data sets on computers which frequently intercommunicate using the method of the invention do not exceed their maximum period of validity, outside of which period the transmission or querying according to the invention is no longer possible, in which case the process must be re-initiated by the sending of a query via e-mail.

It is an object of the invention to form a "community" comprised of a plurality of users of the method of the invention, on a plurality of computers associated with these users. The users may individually select those partners (or their computers) within the "community" for carrying out the method of mutual provision of dynamic IP addresses according to the invention. As mentioned, it is not possible to monitor or identify the members of the "community" and the server structures or codewords which they employ, because the codewords are stored anonymously on the server structures, and the correlation with the true identity of a member of the "community" is only possible for another subscriber to the method of the invention.

In practice, prior to the transmission of the first and second data sets, the user of the computer may be required to provide some data entry confirming this transmission, via an input device connected to the computer.

The computers employed in the described method are as a rule personal computers (PCs) of the respective users, provided with a display device (e.g. video monitor) and an input device (e.g. mouse and/or keyboard). Before the data sets required to carry out the method are transmitted from this computer to a second computer, the user should be required to provide at least one active input, in order to avoid running of the method of the invention without the user of the computer having specific intent for and knowledge of such ruining.

The confirming input may comprise an instruction to send an electronic message (e-mail) to a specified address, which message may comprise the first and second data sets. Ordinarily, the user will send this message to receiving parties known to him, with the aim of establishing agreement to carry out the method of the invention. If the user desires timewise limitation of the invitation and authorization to engage in the method of the invention, the validity of the data in the first and second data sets in the message may be limited to a given time interval, which interval may be as short as desired.

The recipient of the e-mail should also be required to provide a confirming input. The computer which has received the aforesaid electronic message containing the first and second data sets displays the identity of the sender of the message on a display device connected to the computer and posts a request that the user confirm the communication of the invention, such confirmation to be by means of an input device (e.g. mouse and/or keyboard). When the user of the receiving computer confirms the communication, this computer sends back a first and second data set to the first computer. If the request for communication is not confirmed, the aforesaid data sets are not sent back to the sender of the message. Advantageously, the sender of the message will receive an e-mail advising that his query was rejected.

The invention further relates to a computer program product which can be loaded directly into the working memory of a computer and which comprises software code segments for carrying out the described method when the product is executed on a computer.

BRIEF DESCRIPTION OF THE DRAWINGS

Embodiments of the invention are described hereinbelow with reference to the accompanying drawings.

FIG. 1 depicts various computers which are connected to the Internet. The two personal computers (PCs) 1, 101 shown at the bottom are connected, via communication lines 8 (e.g. telephone lines, ISDN lines, or broadband links), to the computer 2 of an Internet service provider. The computer 2 of the Internet service provider is connected via a broadband data line 3 to the Internet 4. Each of the PCs 1, 101 is furnished with the usual components (CPU, RAM, hard disk drive, drive(s) for data storage media such as CDs, DVDs, and diskettes, mains power supply, modem, etc.). An output unit in the form of a video display 6, 106, and an input unit in the form of a keyboard 7, 107 are also provided for each PC 1, 101. Modern PCs also may have additional output units such as speakers, printers, etc., and additional input units such as mouse, trackball, microphone, scanner, etc.

The PCs 1, 101 are not permanently connected to the Internet and do not have permanent IP addresses. Instead, when needed they establish a connection via communication line 8 to the computer 2 of the Internet service provider. At the time of this establishment of the connection, the computer 2 of the Internet service provider dynamically assigns to the PCs 1 or 101 a temporary IP address.

Figure 1:
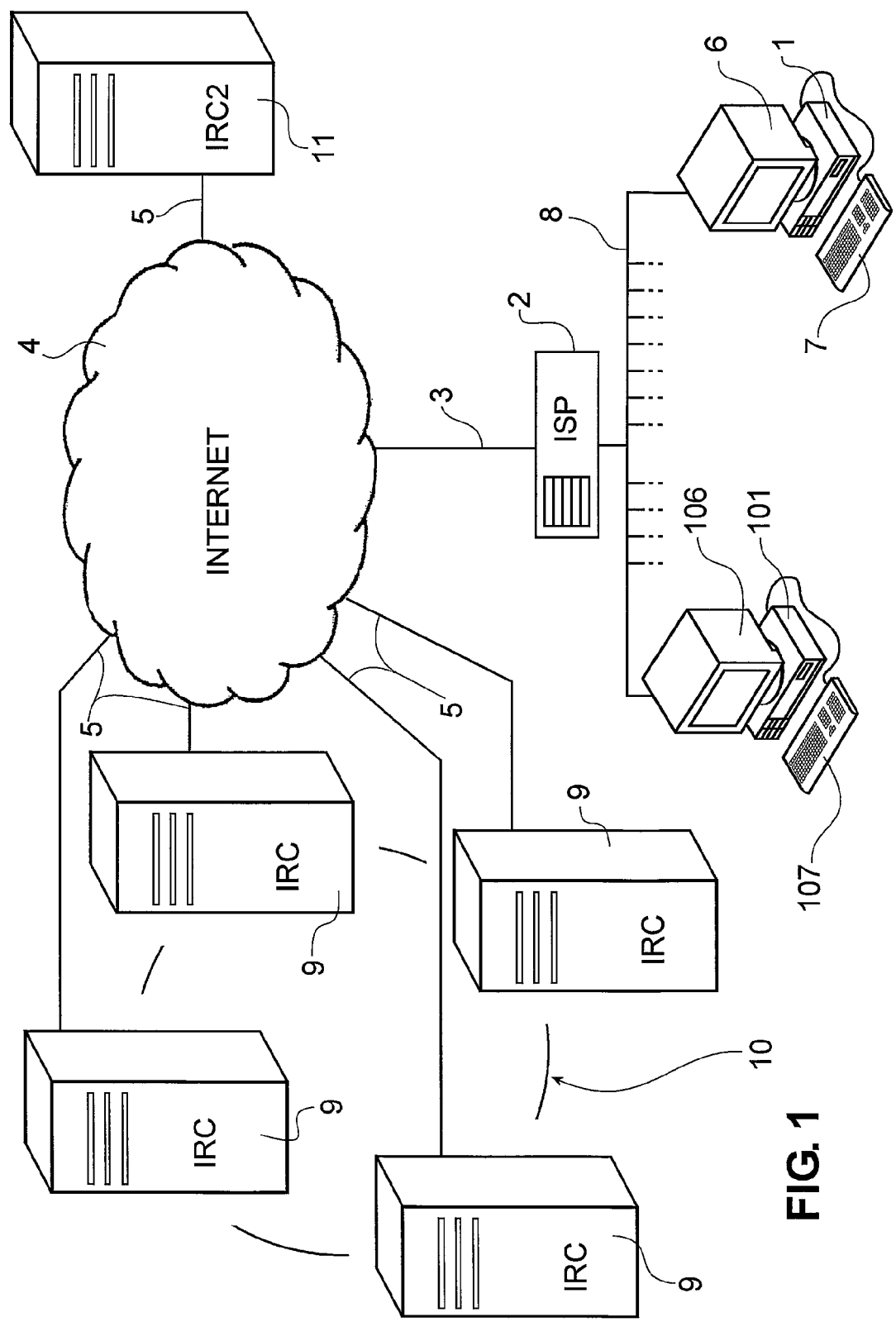
FIG. 1 is a schematic representation of a network system for carrying out the method of the invention.

FIG. 1 also shows a plurality of IRC servers 9, each of which is connected to the Internet via a suitable data line 5. It is not necessary that each IRC server 9 be a standalone computer. Often, IRC servers 9 are defined by specific server programs which run on a web server permanently connected to the Internet 4, which web server has other server functions in addition to the IRC server functions. The fact that the IRC servers 9 shown in the leftward region of FIG. 1 are assigned to a common IRC network 10 does not imply that the IRC servers 9 must be located in spatial proximity to each other. An IRC network 10 may comprise several hundred IRC servers located on various continents.

Another IRC server 11 is shown in the rightward region of FIG. 1, which server does not belong to the IRC network 10. The IRC server 11 may either independently perform the chat function of the IRC (Internet Relay Chat) or may form a second IRC network in connection with other IRC servers.

Each time a connection is established by the PCs 1, 101 with the Internet 4, the PCs are assigned a new IP address by its Internet service provider 2; thus, the PCs 1, 101 cannot intercommunicate directly via the Internet 4. In order to directly transmit a data set to one of the PCs 1, 101, it is necessary to know the IP address of that PC.

Thus, the PCs 1, 101 can exchange data with each other only indirectly, via an intermediary. This can be achieved, e.g., via e-mail services, which are generally offered by the Internet service provider. The computer 2 of the Internet service provider manages numerous e-mail accounts. In order to gain access to an e-mail account on computer 2 of the Internet service provider, access information is needed, such as the name of the e-mail server and a password. In this way, the PCs 1, 101 can retrieve messages which have been sent to their respective e-mail accounts in computer 2 of the Internet service provider.

The method of the invention allows, via the components illustrated in FIG. 1 which are linked through the Internet 4, the provision and transmission of the IP address of a PC 1 and to one or more other PCs 101. This method exploits functionalities which are already offered by, e.g., IRC servers 9, 11 of IRC networks. However, the scope of the method of the invention is not limited to utilization on the Internet or via the described IRC servers 9, 11. Any network structure, e.g. a LAN (local area network), and any other server or computer having a permanent connection to this network structure, which is globally accessible, i.e. from which data can be retrieved by other computers connected to the network structure and which has functions similar to those of an IRC server, can be employed to carry out the method of the invention. Prerequisites for the method of the invention are that an address of a computer in the network structure be stored on the server structure, in connection with an unambiguous codeword for that computer; and the option of retrieving the stored address by submitting the codeword associated with said address.

These functionalities are basic components of the so called Internet relay chat. In an Internet relay chat system, each subscriber to the chat network is assigned a "Spitzname", usually designated by the English term nickname. This nickname comprises of a string of at most 9 characters. In an IRC network 10 the nickname is required to be used only once.

When a computer of a given user logs on to an IRC server 9, the nickname chosen by the user and the address of the user's computer are stored on said server 9. Depending on the structure of the IRC server or IRC network, and depending on the information transmitted by the computer 2 of the Internet service provider to the IRC server, either the IP address itself comprising 4 bytes or a certain string of characters is stored along with the nickname. Said string of characters contains the DNS (Domain-Name-System) address of the computer 2 of the Internet service provider along with individual identification of the individual PC 1 or 101 which PC is connected to the Internet via computer 2 of the Internet service provider.

By the sending a WHOIS command along with the nickname, the IP address or another address associated therewith can be ascertained. In response to the WHOIS command, the IRC server 9, 11 to which the user is logged on under the said nickname sends the said address to the querying computer. If the address thus retrieved is a DNS address, the querying computer can send a second query, accompanied by the DNS address (e.g. a Packet-Internet-Groper (PING), NSlookup command, or getHostbyName function). In response, the querying computer will be provided with the IP address associated with the DNS address.

It should be noted that the nicknames of the IRC subscribers can be freely chosen and that other data stored on the IRC servers can be freely defined by the subscribers. Consequently, as a rule it is not possible to ascertain the true identity of the IRC subscriber.

This is the point of intervention of the method. It exploits the possibility to log on to an Internet relay chat using a user-chosen alias. In this connection, the method of the invention employs a plurality of server structures to which a subscriber can log on using such an alias. This avoids a situation in which the server structure runs a program which monitors the establishment of contacts and the communications between users of the method according to the invention. The large number of IRC networks connected to the Internet are used for direct establishment of contacts.

In the process, a first PC 1, hereinafter the "online computer", transmits to a second PC 101, hereinafter the "receiving computer", data which enable the receiving computer to retrieve the IP address of the online computer 1.

A first data set is transmitted, in which a server structure is identified to which the online computer 1 logs on using a specific alias. As mentioned, the server structure may comprise a single server 9, 11 or an IRC network 10 selected from the numerous available IRC networks.

The data set which the online computer 1 sends to the receiving computer 101 may specify different server structures 10, 11 for different time intervals; e.g., a different server structure 10, 11 may be selected for each day.

E.g., on a given day the IRC network 10 may be selected as the server structure, and on the following day the IRC server 11 may be selected. Thus each server structure 10, 11 specified in the first data set may be associated with a time-limited validity. It is possible to specify a plurality of server structures for a given time. In such a case, e.g., the online computer 1 logs on to two server structures simultaneously. Care must be taken, however, to ensure that these server structures do not belong to the same IRC network, because otherwise logging on to two server structures using the same nickname will be prohibited. Alternatively, a different nickname may be employed for each of the server structures which are utilized simultaneously.

The online computer 1 also sends to the receiving computer 101 a second data set, which specifies at least one currently valid codeword, in particular a nickname for an IRC network 10. E.g., in the second data set a series of seven nicknames may be specified, in arbitrary order, one for each day. Alternatively, algorithms may be employed for computing a nickname, the second data set containing only the values of one or more variables to be employed in the algorithm.

The receiving computer 101 can now ascertain said IP address in the above-described manner using the nickname and the server structure which the online computer 1 is using for provision of its IP address. It sends a WHOIS command along with the nickname to the identified server structure 10 or 11, and if necessary a second query for conversion of the received DNS address into an IP address.

If the WHOIS command is not answered and does not lead to retrieval of either an IP address or a DNS address of the online computer 1, the receiving computer 101 may send a specific text message via the IRC server 9, 11 to the online computer 1, specifying as recipient of this message the nickname of the online computer 1. The IRC server 9, 11 then forwards the message to the IP address or DNS address of the online computer 1. A program module according to the invention running on online computer 1 sends back as a response to the receiving computer 101 the IP address of the online computer 1. If the specific text message generated by the receiving computer 101 contains the IP address of the receiving computer 101, this response can be sent directly to that IP address. Otherwise the response may be sent, using the nickname of the receiving computer 101, to the receiving computer 101 via the IRC network.

As soon as the receiving computer 101 ascertains the IP address, preferably the receiving computer 101 transmits its own IP address to the online computer 1. In this case the two computers can directly intercommunicate bidirectionally. Preferably the receiving computer 101 also sends a data set with a list of server structures which the receiving computer 101 will be using during a specified time period (e.g. a week, a month, or a series of months), along with information concerning the nicknames which will be used during this time period. In this way, the online computer 1 will also be able to determine IP address of the receiving computer 101 when logging on to the Internet at future times.

In order to initiate the execution of method according to the invention on two computers 1, 101, the user of one of the computers 1 or 101 sends an e-mail to the other computer 101 or 1. This message contains the two data sets with the identification of the server structure and the identification of the codeword. The computer 1, 101 which receives the e-mail outputs via a display device 6, 106 for the user a clear query as to whether the user wishes to acknowledge and accept the inquiry from the sender. Only after active confirmation of this query, via an input device (e.g. keyboard 7 or 107 or a mouse) will the computer 1, 101 carry out the method for exchange of IP addresses. In this way one avoids carrying out the method of the invention unwittingly and involuntarily with strange computers.

Because the data sets exchanged have time-limited validity, it is not interesting for third parties to monitor and intercept them. An intercepted data set will quickly lose its value. Thus, the computers 1, 101 will only maintain permanent direct contact if they establish contact with each other using the method of the invention at regular intervals.

If no new contact between the computers 1, 101 is established prior to the expiration of the validity of the information in the data sets, it will be necessary to re-initiate the method of the invention, by sending an e-mail from one of the two computers 1, 101.

Figure 2:
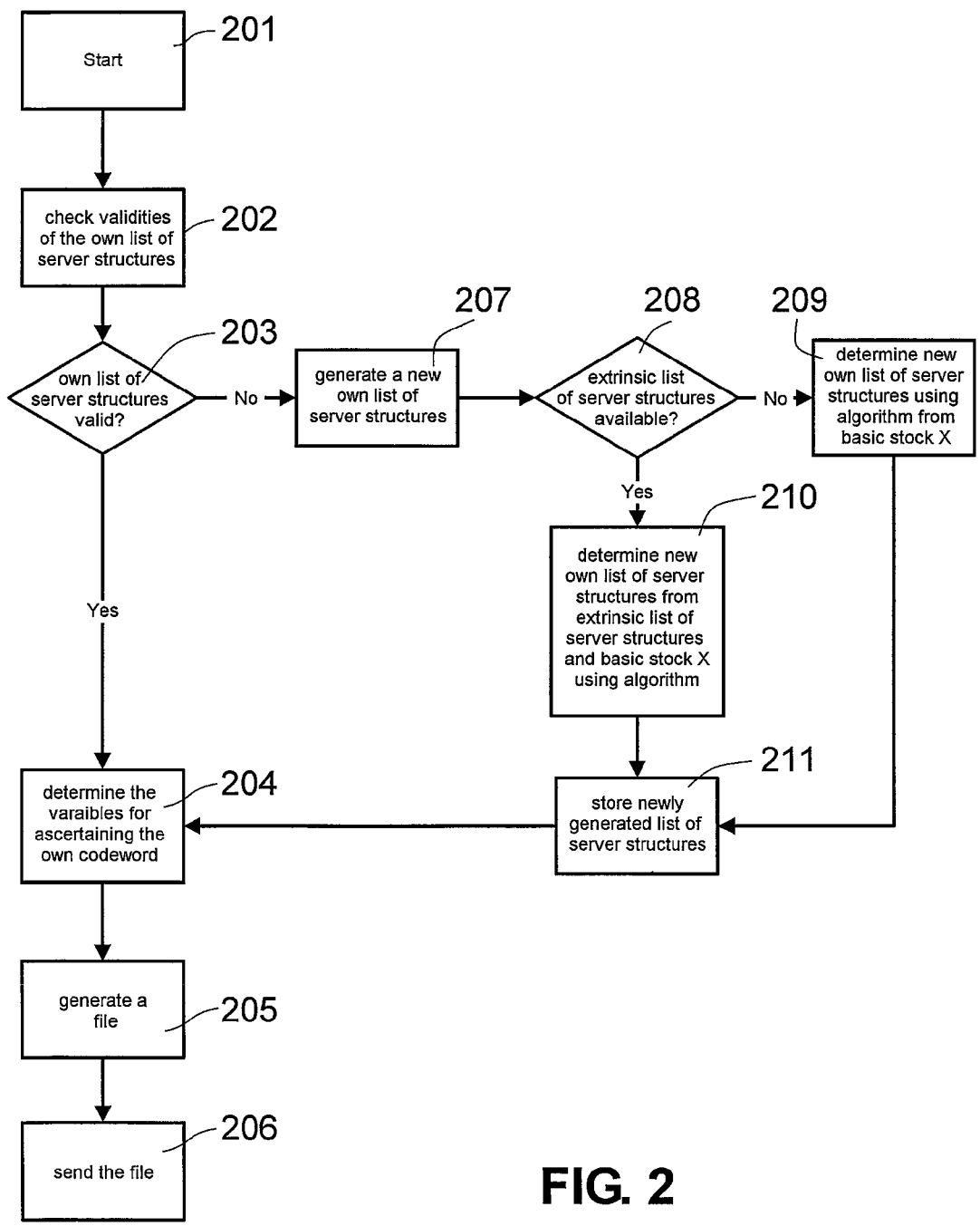
FIG. 2 is a schematic flow diagram of a computer program for generating the data sets which are employed in the method of the invention.

FIG. 2 shows a flow diagram of a computer program which generates the first and second data sets needed for the method of the invention.

After the start 201 of the program, the validity of the own list of server structures is checked 202. If the check exercise returns the validity of the list of server structures at fork 203, the variables for an algorithm for determining the codeword are determined 204. The algorithm used in the computer program according to the invention may comprise any computing operations which lead unambiguously to a codeword when a given variable set is used. In connection with the codeword, the constraints imposed by the server structure should be taken into account, e.g., number of characters and the admitted character set. Preferably, random number generators may be employed in the determination of the variables. For individualizing of the variables, various items of individual data can be employed, e.g. the stored name or serial number of the computer, or the current system time or date, which data may depend on inputs provided by the user via an input device, e.g. mouse or keyboard.

As soon as a data set with the valid list of server structures and a data set with variables for determination of the codeword are generated, both data sets are written into a file 205 and sent to a receiving computer, which is authorized to query the own IP address according to the method.

If the validity check returns at fork 203 that the own list of server structures is invalid this server structure list is regenerated 207. Depending on whether a server structure list supplied by the partner computer is available at fork 208, the own list of server structures is prepared either according to an algorithm, from a basic stock of available server structures, i.e. server networks or individual servers, or taking into account and using the list from the partner computer. In this instance as well, the programmer is completely free to employ any means for implementing an arbitrary and random generation of a server structure list. When the server list is generated and stored 211, then in step 204 the variables for computing the nickname are determined and the file with the set of data for the used servers and nicknames is generated and sent. As mentioned, the data sets for the server structures and for the codewords (nicknames) entail a plurality of randomly determined entries, each of which is provided with a time stamp. Thus, it is assured that, if an unauthorized computer intercepts a data set, this data set will be unusable after expiration of the last validity period of the entries in this data set.

Figure 3:
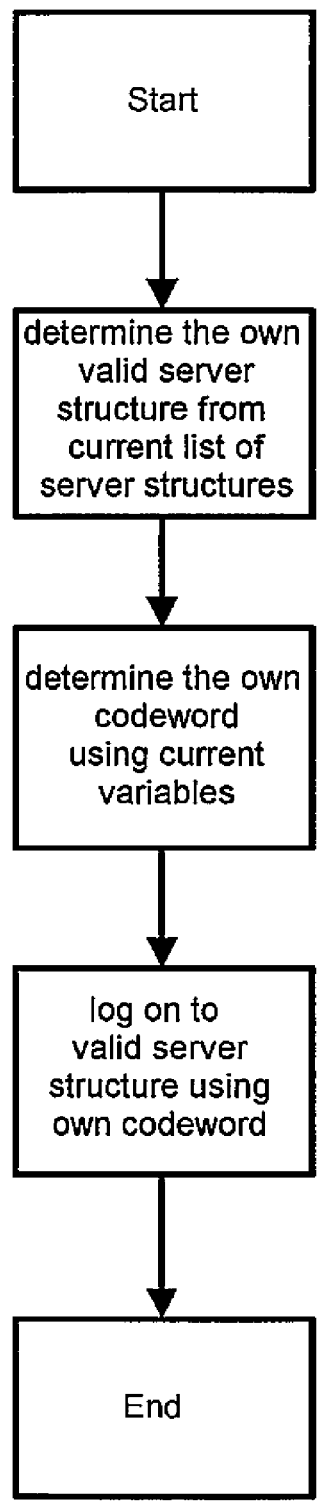
FIG. 3 is a schematic flow diagram of a computer program module which provides the own address according to the invention.

FIG. 3 shows the program steps executed to provide a computer's own IP address each time the online computer logs on to the Internet. From the file generated according to FIG. 2, which provides the own server structure list and the variables with time-limited validity for the own codeword, the currently valid server structure and currently valid codeword (nickname) are obtained. The online computer then logs on to the ascertained IRC server, using the ascertained nickname. This results in storage of the IP address or a DNS address in association with said nickname, on said IRC server.

Figure 4:
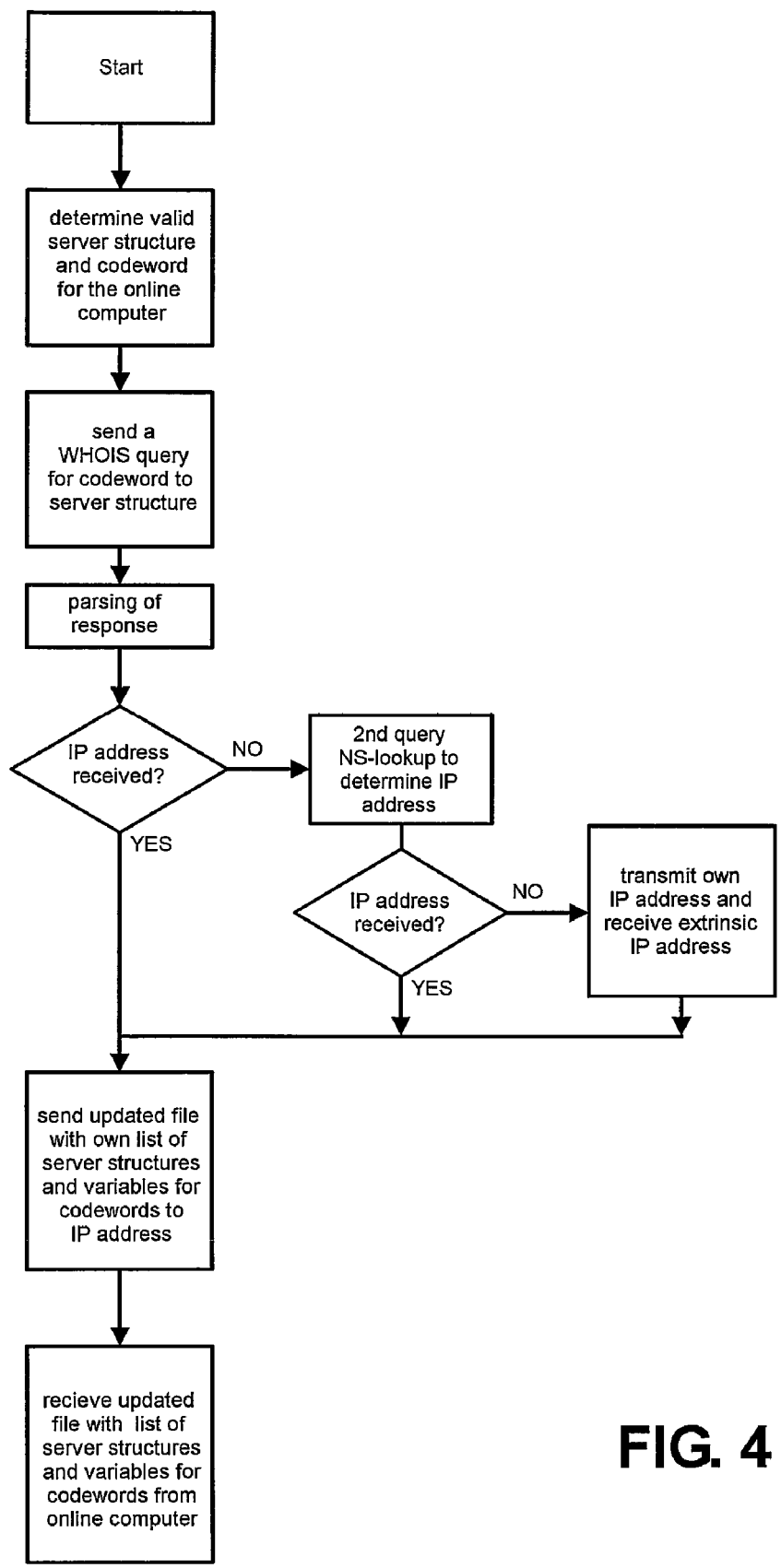
FIG. 4 is a schematic flow diagram of a computer program module which ascertains an IP address according to the invention.

FIG. 4 illustrates the course of execution of a program module running on a receiving computer seeking to ascertain the IP address of an online computer. From the file containing the data sets which the receiving computer has received from the online computer according to FIG. 2, the receiving computer determines the currently valid IRC server or IRC network and the nickname, for the online computer. The receiving computer sends a WHOIS query to the IRC server and analyzes it semantically (also referred to as parsing). If this analysis determines that the IP address has been transmitted, the process then proceeds to the final step, in which the receiving computer sends to said IP address an updated file containing the own server and nickname data sets. In response to this, in a handshake process, the online computer sends its updated data sets to the receiving computer.

If the parsing analysis determines that the response to the WHOIS query does not contain an IP address, a second query (NSlookup) is sent, with the aim of ascertaining the IP address. This is followed by the abovementioned handshake process.

This last step of converting the DNS address into an IP address is not absolutely necessary, because data can be sent directly to the DNS address. However, it is preferable to employ the IP address; thus the program sequence according to FIG. 4, in which the IP address is ascertained in all cases, is preferred.

If neither the WHOIS query nor the NSlookup query, to the IRC server, yields a valid IP address, e.g. because the WHOIS query did not lead to a valid address of the online computer, a specific text message will be sent to the online computer via the IRC network, which message contains the IP address of the receiving computer. The program of the invention running on the online computer will analyze this text message, and will be triggered by its content to send back a message which contains the IP address of the online computer.

If it turns out at the start of the program sequence according to FIG. 4 that the stored file received by the online computer no longer contains valid data, this means that the last contact was not recent enough. In such a case it is necessary to send an e-mail to the online computer, which e-mail contains a current file with the own data sets according to FIG. 2, and to query whether the re-exchange of IP addresses is agreed to. If the parsing determines that it is not possible to ascertain a valid address of the online computer, e.g. because the online computer is not in fact online, the method is interrupted and resumed at a later time. These special case procedures are not illustrated in FIG. 4.

Although the present method has been described as being present on a computer, it is also possible to store a program embodying the method on a known computer readable memory medium, such as a disk or other storage device, which could then be loaded into a computer. The computer could then execute the program so that the method would be followed by the computer.

The invention claimed is:

1. A method for provision of an address of an online computer which is connected to a data network, for at least one receiving computer wherein the method comprises:
    the online computer transmitting a first data set comprising the identification of at least one server structure globally accessible over the data network, to the receiving computer, the server structure being selected from a plurality of available server structures; and
    transmitting a second data set which identifies at least one codeword, to the receiving computer; and
    assigning a time-limited validity to the identified codeword;
    wherein the second data set identifies a plurality of codewords having time-limited validity, the durations of such validities covering different time intervals;
    the server structure storing said address of the online computer together with said identified codeword,
    the receiving computer sending a query to the server structure, wherein said query contains the identified codeword; and
    the server structure sending back, as a response, the address of the online computer.

2. A method according to claim 1, further comprising:
    the server structure forwarding the response to the online computer, and the online computer sending back to the receiving computer, as a response, the address of said online computer.

3. A method according to claim 1, wherein the data network is the Internet, and the address is an IP address.

4. A method according to claim 1, wherein the data network is the Internet, and the address is an address unambiguously associated with an IP address.

5. A method according to claim 4, the method further comprising: the receiving computer determining the IP address of the online computer via a second query which contains the associated address.

6. A method according to claim 1, wherein the identification of a server structure globally accessible over the data network is the name of an IRC network.

7. A method according to claim 6, wherein the query sent by the receiving computer is a WHOIS command sent to an IRC server structure.

8. A method according to claim 1, wherein the identified codeword is computed by a defined algorithm with at least one variable; and
    wherein the second data set has at least one value for the at least one variable for computing the identified codeword.

9. A method according to claim 8, wherein the variable has a time-limited validity.

10. A method according to claim 9, wherein the second data set has a plurality of variables which have time-limited validity, the durations of such validities covering different time intervals.

11. A method according to claim 8, wherein the algorithm for computing the identified codeword employs time-dependent information.

12. A method according to claim 1, wherein the identified codeword is a nickname for logging on to an IRC network.

13. A method according to claim 1, further comprising:
    transmitting from the receiving computer to the online computer the following:

a third data set, with the identification of one of the at least one servers globally accessible over the data network, the server structure being selected from the plurality of available server structures;

a fourth data set, identifying a second at least one codeword;

the receiving computer storing on the server structure the address assigned to said receiving computer, together with the second identified codeword.

14. A method according to claim 1, further comprising:
prior to the initial transmission of the first and second data sets, providing a request to a user of the online computer to input an entry indicating approval and acknowledgement of such transmission via an input device connected to the online computer.

15. A method according to claim 14, wherein the approving and acknowledging input is a command to send an electronic mail (email) message, with the first and second data sets, wherein said email message is sent to a specified address.

16. A method according to claim 14, the method further comprising:
after the online computer has received the aforesaid email message containing the first and second data sets, said online computer displaying an identity of a sender of the message on a display device connected to the online computer,
displaying a prompt on said display device, requesting that the user of the online computer input an acknowledgment by means of an input device connected to the online computer, and sending the first and second data set back only if such an acknowledgment is input.

17. A method for provision of an address of an online computer which is connected to a data network, for at least one receiving computer wherein the method comprises:
the online computer transmitting a first data set comprising the identification of at least one server structure globally accessible over the data network, to the receiving computer, the server structure being selected from a plurality of available server structures; and
transmitting a second data set which identifies at least one codeword, to the receiving computer; and
assigning a time-limited validity to the identification of a server structure globally accessible over the data network; and assigning a time-limited validity to the identified codeword;
wherein the second data set identifies a plurality of codewords having time-limited validity, the durations of such validities covering different time intervals;
the server structure storing said address of the online computer together with said identified codeword;
the receiving computer sending a query to the server structure, wherein said query contains the identified codeword; and
the server structure sending back, as a response, the address of the online computer.

18. A method according to claim 17, wherein
the first data set comprises a plurality of identifications of server structures globally accessible over the data network, which identifications have time-limited validity, the durations of such validities covering different time intervals.

19. A computer readable memory medium embodying program instructions for providing an address of an online computer, wherein the program instructions are configured to perform a method comprising:
the online computer transmitting a first data set comprising the identification of at least one server structure globally accessible over the data network, to a receiving computer, the server structure being selected from a plurality of available server structures; and
transmitting a second data set which identifies at least one codeword, to the receiving computer; and
assigning a time-limited validity to the identified codeword;
wherein the second data set identifies a plurality of codewords having time-limited validity, the durations of such validities covering different time intervals;
the server structure storing said address of the online computer together with the identified codeword;
the receiving computer sending a query to the server structure, wherein said query contains the identified codeword; and
the server structure sending back, as a response, the address of the online computer.

* * * * *